A. PALMROS.
MOTOR CAR.
APPLICATION FILED NOV. 22, 1900.
1,053,062.
Patented Feb. 11, 1913.
5 SHEETS—SHEET 5.
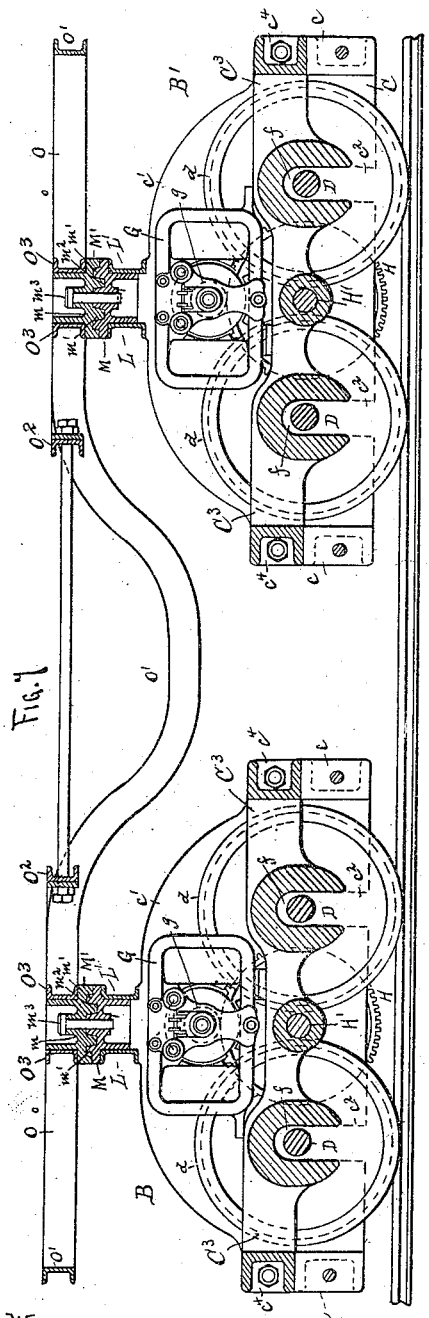
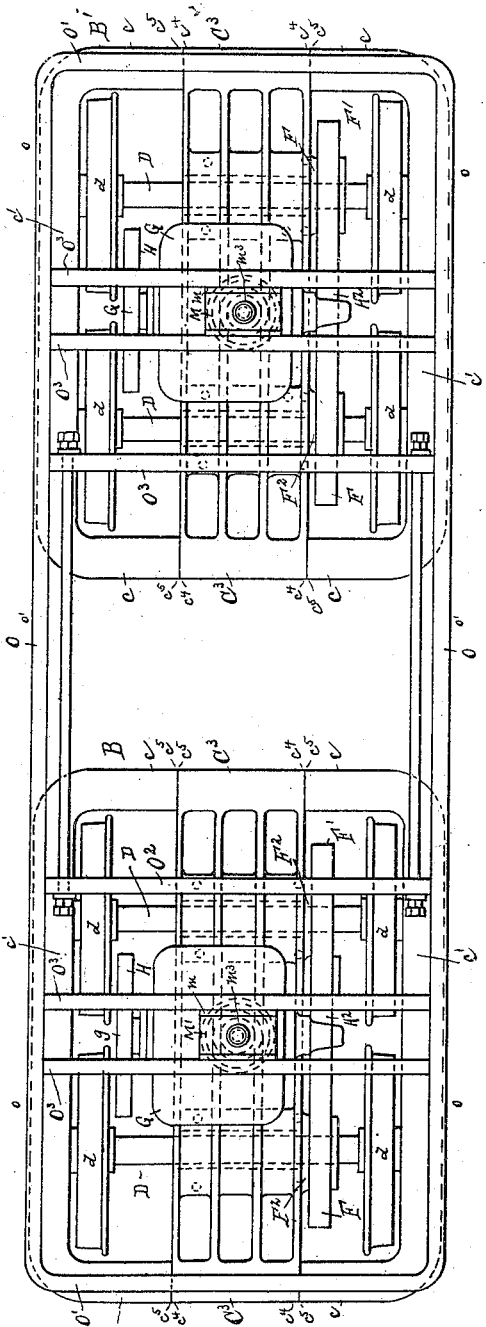
WITNESSES.
A. K. Williams Jr.
C. H. Woodward
Alexander Palmros INVENTOR,
By H. H. Bliss ATTORNEY.

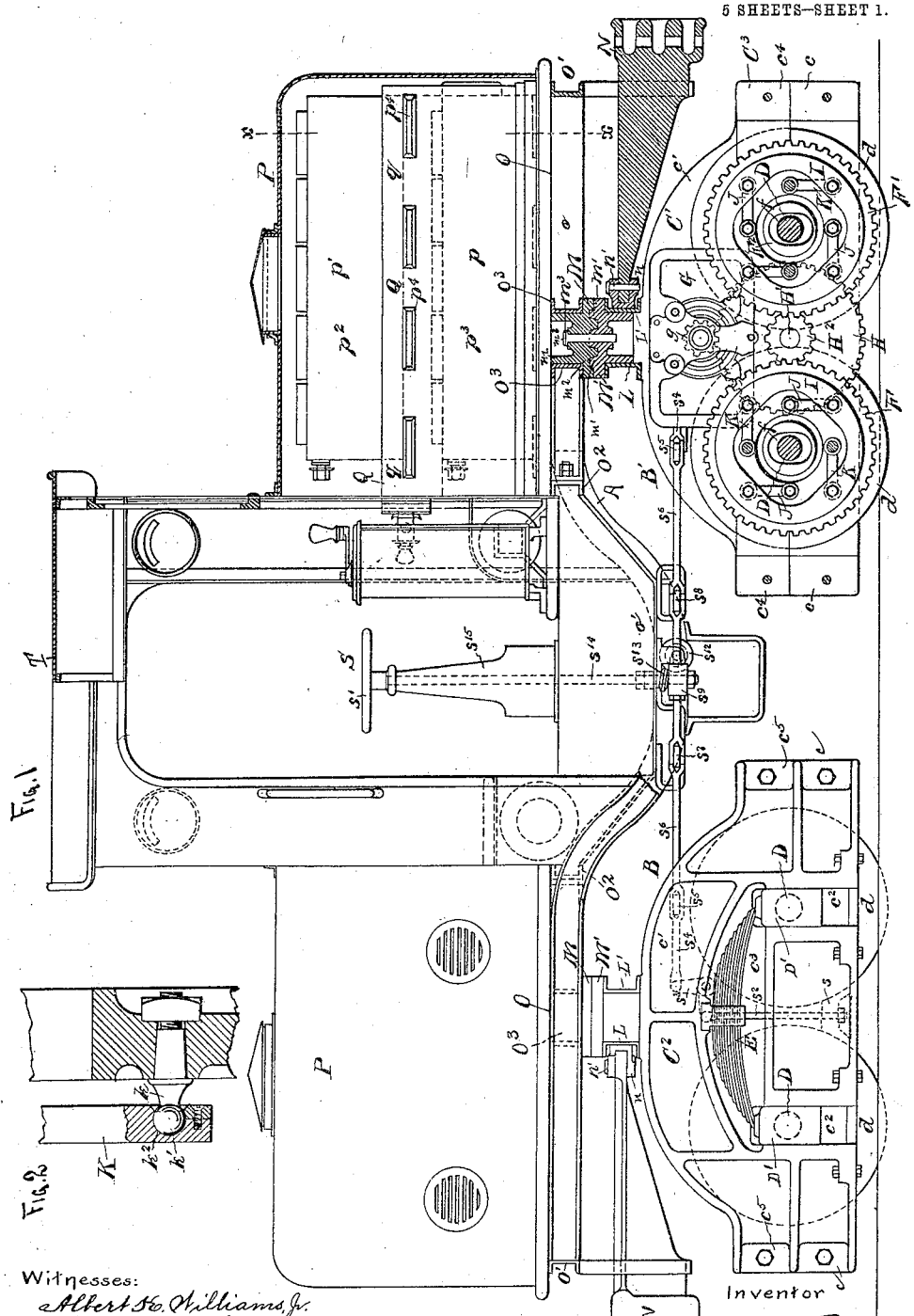

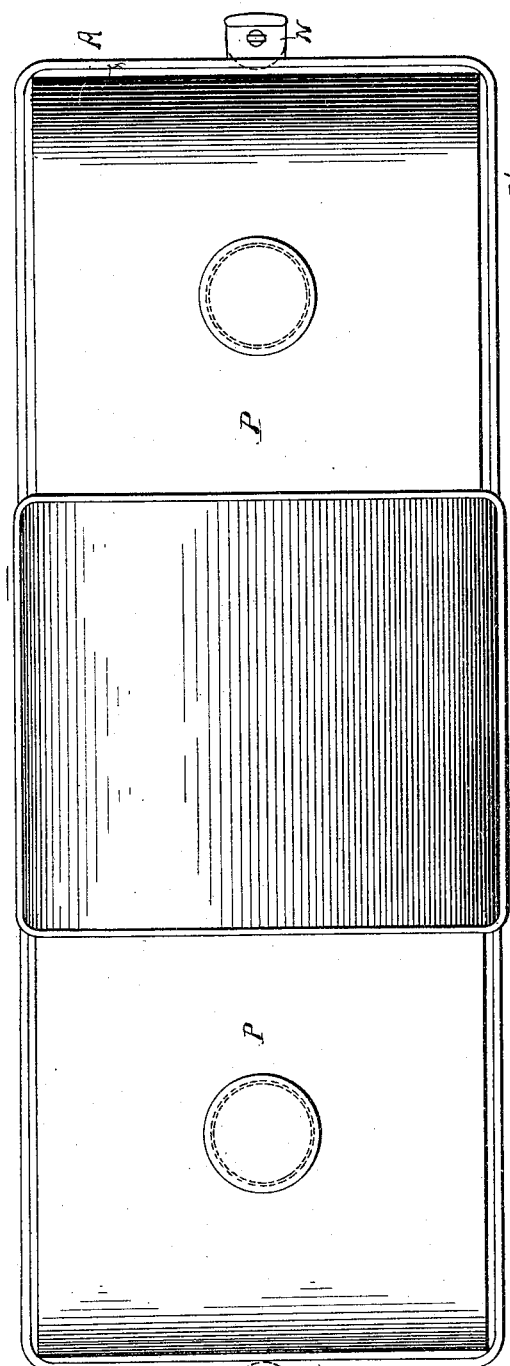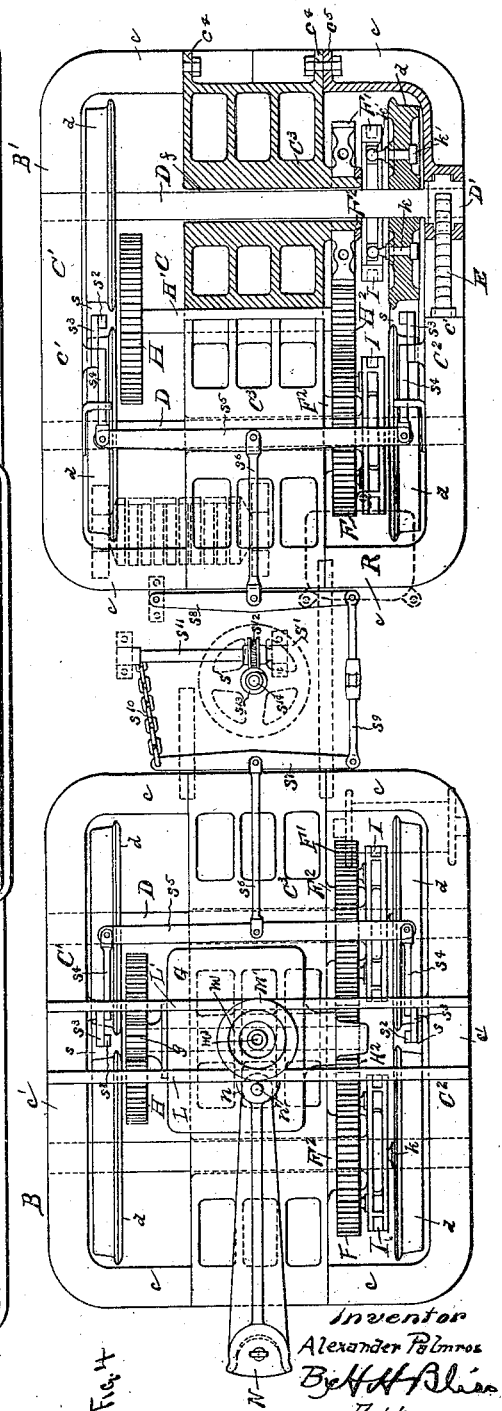

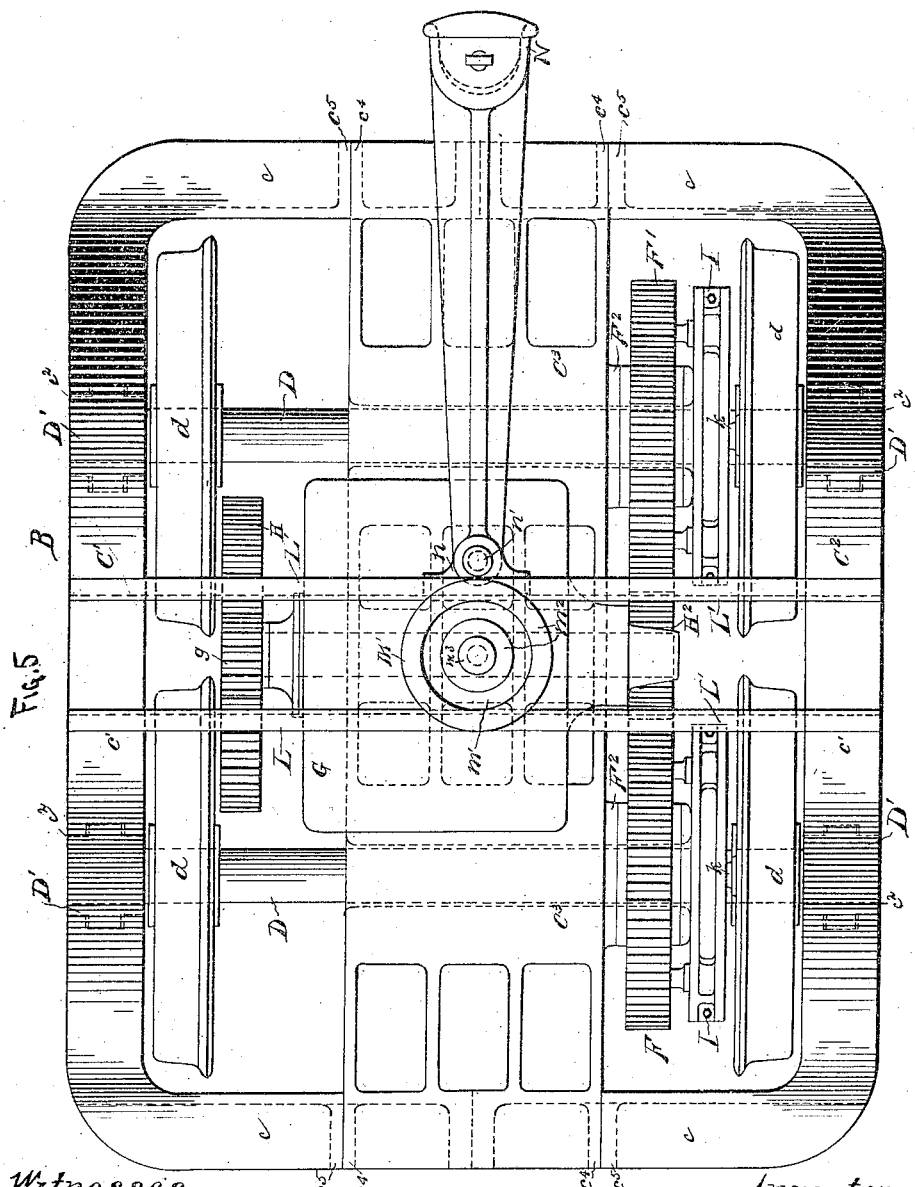

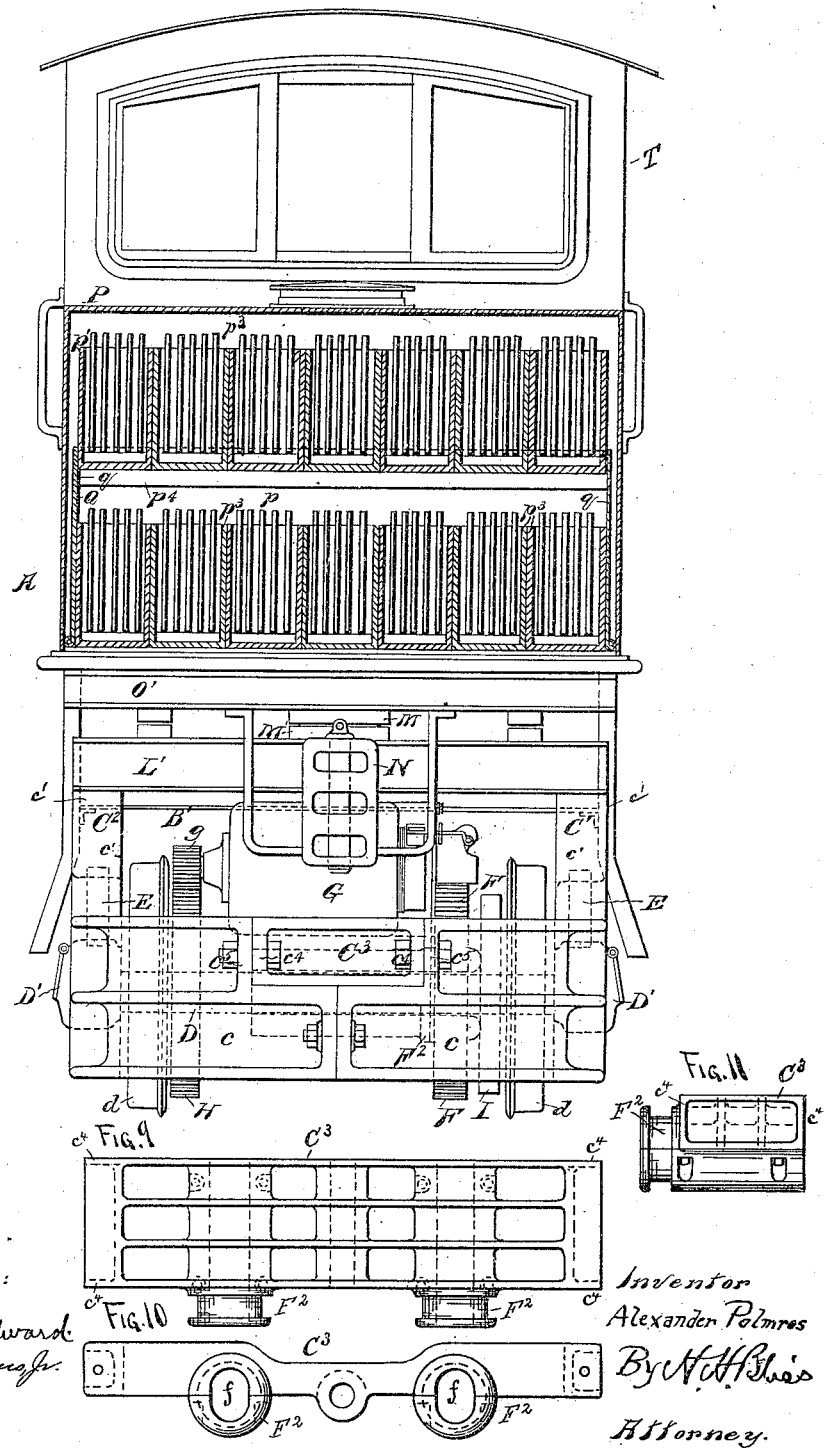

);

UNITED STATES PATENT OFFICE.

ALEXANDER PALMROS, OF COLUMBUS, OHIO, ASSIGNOR TO THE JEFFREY MANUFACTURING COMPANY, OF COLUMBUS, OHIO, A CORPORATION OF OHIO.

MOTOR-CAR.

1,053,062.  Specification of Letters Patent.  Patented Feb. 11, 1913.

Application filed November 22, 1900. Serial No. 37,345.

*To all whom it may concern:*

Be it known that I, ALEXANDER PALMROS, citizen of Finland, residing at Columbus, in the county of Franklin and State of Ohio, have invented certain new and useful Improvements in Motor-Cars, of which the following is a specification, reference being had therein to the accompanying drawing.

This invention relates to motor cars of the type provided with a main body, and with two separate motor driven trucks pivotally connected with the body.

One of the objects of the invention is to provide a car having the body and trucks constructed to be correlated in an improved manner.

Another object is to provide an improved draft construction for motor cars of this type.

Other objects will be apparent from the following specification and claims.

Of the accompanying drawings which illustrate one embodiment of my invention Figure 1 is a view partly in side elevation, and partly in vertical section of a car embodying my improvements. Fig. 2 is an enlarged detail of the flexible traction wheel coupling. Fig. 3 is a plan view of the body part. Fig. 4 is a plan view of the truck, with the body part removed. Fig. 5 is a plain view, enlarged, of one of the trucks. Fig. 6 is an end elevation with the storage battery casing in section on the line *x*, *x* of Fig. 1. Fig. 7 is a longitudinal sectional elevation of the truck frames and the connected platform. Fig. 8 is a plan view of the same. Fig. 9 is a plan view, Fig. 10 is a side view, and Fig, 11 is an end view of the central member of the truck frame detached.

In the drawings a vehicle is illustrated which has a body part indicated as a whole by A, and trucks indicated, respectively, by B, B'. Inasmuch as the trucks are substantially similar to each other, a description of one will suffice for an understanding of both.

Each truck is composed of a body part with two axles D, D, and each axle with its two truck wheels *d*, *d* rigidly secured thereto. The truck body is composed of three main castings, of which the two side members are substantially similar in shape, and indicated by C', C², and the other or central member indicated by C³. The side members C', C² are each cast with an upwardly extended standard-like part $c'$ at the side. Each is formed with two passage-ways or guideways $c^2$ extending up from the bottom edge, and shaped to provide guides for the axle boxes. On the outer face each is cast with a chamber at $c^3$ to receive and retain the axle spring, to be described. The third part of the truck body indicated by $C^3$ is situated at the center and longitudinally of the truck, and extends from one end thereof to the other. It is formed at the ends with vertical webs $c^4$ which fit against webs $c^5$ on the side parts C', C², and by which it is securely bolted to them. When these parts are fitted together there is provided an exceedingly strong, heavy, metallic truck frame, not only capable of withstanding the severe shocks and strains to which it is subjected, but also adapted to increase the tractive efficiency of the locomotive; it being understood that one of the purposes of this construction is to provide a compact hauling engine or locomotive, which shall be capable of a powerful pull, and also adapted to move in restricted spaces, as in tunnels, mine entries, freight houses, and the like.

At each end of each axle D there is an axle box D' fitted in the guide-way $c^2$ in the side castings of the truck body.

E indicates the spring which is mounted in the chamber or cavity at $c^3$ in the outer face of the side casting, its center being rigidly secured to the casting, and its ends being arranged to bear downwardly upon the axle boxes D'. And it will be seen that when the truck body or frame, the axles and their boxes, and the springs, are assembled, the weight of the truck is taken off from the axles, except in so far as it is transmitted through the springs.

The axles are rotated by the gear wheels F, F', respectively. These wheels are mounted upon bosses or projecting hubs $F^2$ attached to and extending laterally from the central truck bar or frame piece $C^3$. The gear wheels are driven by the electric motor indicated by G. This motor is rigidly fastened to the central longitudinal truck bar or frame piece $C^3$. The armature is arranged transversely, and its shaft is provided with a pinion $g$ that meshes with a larger master gear wheel H. This gear wheel is secured to the countershaft H'. The central longitudinal bar $C^3$ is bored, or otherwise shaped to provide a bearing for this shaft, the whole extending through the frame piece, and carrying the pinion H² at the other end. This pinion H² lies between, and engages with both of the aforesaid gear wheels F, F' on the axle. Thus, as will be seen, the motor, and all of its important adjuncts, are rigidly mounted on the truck body or frame, in contradistinction with those mechanisms in which the motor is connected to the axle by a hinging device of one sort or another, and only partly supported upon the car body, generally by means of a spring or equivalent resilient support, and in which the gear wheels (corresponding to those at F, F') were rigid with the axles. By doing so I relieve the axles, their wheels, and the track rails, of the pounding and jarring which they experience when the motor is mounted in the common way last referred to, with its weight entirely, or very largely, carried by the axle, as in the present case the motor, with its armature, countershaft, and intermediate gearing, is allowed to rise and fall upon the spring supports which bear on the axle boxes.

To transmit the power uniformly and smoothly at all times from the gearing to the axles, I employ the following device, whereby the rising and falling of the parts, including the countershaft and its pinion H², will not produce serious disadvantages in the transmission of the power to the wheels F, F' as it would if they were rigid with the axles, and vertically stationary as in the earlier common constructions: I indicates a ring or open centered disk, which is placed around the axle, and lies in vertical planes between the track wheel and the gear wheel F or F'. It is connected to the gear wheel (F for instance) by means of links J, J, each of which is pivoted at one end to the wheel F, and at the other end to the ring I. The ring, in turn, is connected flexibly to the truck wheel by means of the links K, K. The pivots or hinge pins which engage with the links K, K, are connected thereto by a ball and socket joint. Such a pin or pivot is shown at k, it having a ball like head k'. The link has a socket at k² in which the ball or pin is fitted. As a consequence the car axle is permitted to rise and fall relatively to the body without any cramping or binding of the pivotal connections of the links, as the latter can relatively swing out and in and still maintain the proper connection between the parts.

The bearing bosses F² have central apertures, as shown at f, which are larger than the axles D, and consequently the bosses. and all of the parts rigidly connected therewith, to wit, the truck body and motor, and the gearing, can rise and fall to the extent permitted by these enlarged apertures j.

The central opening in the ring I is considerably larger than the axle in the bearing piece F², and consequently permits of the vertical playing of axle and body, as to each other, that is demanded. The ring, although having no central support, is at all times held in proper position by the links, there being of course a slight play vertically and horizontally, to conform to the vertical movements of the parts connected by it.

By having all of the toothed gears mounted in fixed relations, that is, in such a way that there is no movement of their axes relative to each other, I secure several important advantages in a locomotive of this character. The armature is always in the same relation to the gearing throughout the train. The wheel F' is at all times driven thereby with the same efficiency as the wheel F; and it is well known that where the power can be thus collected and uniformly applied to both axles of a car, or truck, the tractive efficiency is correspondingly increased, there being a constant tendency for one or other of the axles, and its truck wheels, to bound up or escape from the track, and at all such instants the traction or pulling power is correspondingly decreased.

The connecting devices or gearing which I have described as being interposed between the motor and the two axles of the truck supporting the motor constitute a universal connection between these parts, that is to say, the gearing allows a rising and falling of the axles lative to the truck, and consequently relative to the motor, without disturbing the direct and constant connection under any working condition between the motor and both axles.

By taking the weight of the motor, and all of the gearing off from the axles (except so far as it is transmitted through the spring E) disastrous action upon the track rails is so reduced that I find that a very much lighter rail can be used, all other things being equal, and the cost of an entire railway system can be proportionately reduced.

In the vehicle as a whole, which is selected for an illustration, there are two trucks corresponding to that above described. They are flexibly connected together and to the superposed body as follows: L, L' are cross bars. There are two of these for each truck, the pair constituting a brace, and each formed of angle iron. They are bolted to the upwardly extended upright parts c' of the truck frame. At the center transversely of each brace there is a pivoting device secured. Each of these consists of plates M, M', they corresponding to the fifth wheel of a vehicle, that is to say, providing extended hinging bearing and wearing surfaces. Each part M, M' is formed with a base part m one of which is secured to the aforesaid cross-bars or braces L and L'. The plates M, M' are formed with circular ribs $m'$ and grooves $m^2$, the ribs of one entering into the grooves of the other. And at $m^3$ there is a bolt that passes through them. A powerful pivoting connection is provided, by means of the interlapping ribs and grooves at $m'$, $m^2$, and consequently the bolt $m^3$ can be quite light, it being relieved of all torsional or transverse strain, its only function being to prevent vertical displacement of the body part from the truck.

The draft is transmitted from or to the vehicle by peculiarly formed draw-bars. There is one of these at each end, and each is indicated by N. It is extended inward, and is free of the truck until it reaches the cross bar or brace L, L'. It is pivoted to the latter, there being a pivot ear $n$ secured to the cross bars, and to this the draft bar is secured by the vertical pivot $n'$. By applying the draft at the points indicated, that is relatively high and at the point of pivotal connection of the truck to the body, the truck is not seriously interfered with in its oscillations on the track. And it is left to flexibly accommodate itself to different variations that are required in its path.

The two trucks are connected together principally by the frame at the bottom of the body. This frame consists of the angle irons O, O bent to form the upper horizontal parts or platforms $o$, and the central drooping parts $o'$. These sill bars are connected at the ends by cross girths O'. At intermediate lines they are connected by the cross angle bars $O^2$, $O^3$. To the centers of the latter are secured the base parts $m$ of the pivot piece M'.

Above the central drooping part of the frame is formed the cab or housing for the motorman, this containing also the manual devices by which the brakes are applied, and that by which the current is controlled in its passage to the motors, and the other devices ordinarily required for operating a vehicle of this sort.

Over the end parts of the frame there are arranged the casings or boxes P, P for the storage batteries. The cells are arranged within this housing in the way illustrated. They are in two horizontal tiers, the lower being indicated by $p$, and the upper by $p'$. The cells are placed in boxes or chests as at $p^2$, $p^3$. The boxes or receptacles $p^3$ rest upon the floor of the car body. Above these lower cells are placed the supporting bars $p^4$, upon which rest the cells and the boxes of the upper tiers. The cross bars $p^4$ are held by a frame Q, the side bars $q$, $q$ of which hold the cross bars. When building up the battery the bottom cell boxes at $p'$ are first arranged on the car; then the frame Q is placed over them, and then the upper cells and boxes at $p$ are placed on the bars $p^4$, and the housing is closed.

R indicates the controller interposed between the battery and the motors, the details of which can be of any suitable sort. The cells of the battery are arranged in sets, and the electric connections between these cell sets and the controller are such that the cell sets can be either all in series, or all in multiple, or so that each half of them will have its component sets in series, and the two halves in multiple.

The brake mechanism is indicated by S. $s$ is a wedge shaped brake shoe arranged between the peripheries of two of the track wheels. There is one of these shoes on each side of the truck. They are operated by means of a hand wheel $s'$ in the motorman's cab T by the following device: The shoes are secured to links or draw rods $s^2$ which are pivoted to bell crank levers $s^3$, and the are pivoted to bell crank levers $s^3$, and the latter are connected by the links $s^4$ to the equalizing bars $s^5$. $s^6$, $s^6$ are links connecting the equalizing bars to the levers $s^7$, $s^8$, respectively. The lever $s^8$ is pivoted at one end to the frame-work, and at the other end is connected by a link $s^9$, to the lever $s^7$. The latter has a chain $s^{10}$, one end of which can be wound upon a winding shaft $s^{11}$, mounted on the underside of the framework. The shaft $s^{11}$ has a worm gear $s^{12}$, with which the worm pinion $s^{13}$ meshes. This worm is on the shaft $s^{14}$ mounted on the standard $s^{15}$, in the cab, and secured to the hand wheel.

The central longitudinal part $C^3$ of the truck frame can at the points adjacent to the axles of the track wheels be either constructed as shown in Fig. 7 with vertically elongated slots or chambers open at the bottom, or it can be formed with closed tubular axle chambers, as shown in Figs. 9, 10 and 11, there being below the main part of the casting $C^3$ separable pieces which can be bolted to the main part. Here the tubular boss or bearing at $F^2$ for the gear wheel which surrounds the axle is of a nature shown in these Figs. 9, 10 and 11; in the other case this boss or bearing may be provided by bolting suitably shaped parts to the sides of the longitudinal frame parts $C^3$.

Space is economized to the utmost because of the relative arrangement of the trucks and body parts, the trucks being respectively under the ends of the relatively elevated parts of the body, the cab or central part being depressed to lines below the top of the motor trucks, the frames of these trucks being inclined or curved downward toward their inner ends, and conforming to the contour of the bottom of the depressed part of the body.

What I claim is:

1. The herein described short base locomotive, it having a body provided at each end with a platform adapted to receive a housing, and at the central part between the platforms with a cab having a floor depressed below the platforms, two independent trucks arranged under the platform portions of the body and connected therewith by vertically disposed pivotal connections, and independent electric motors, one secured to each of the truck frames and arranged to drive the track wheels thereof, the motors being controlled from the said cab portion of the body, substantially as set forth.

2. The combination of the connecting frame, the two independent trucks vertically pivoted to the frame, the electric motors secured to the truck frames respectively, and geared to the axles, and the draw bars pivoted to the truck frames at points adjacent to their vertical pivots substantially as set forth.

3. The herein described vehicle for a storage battery locomotive, it having a body provided at each end with a casing or housing for battery cells, and at the central part between said housings a cab with the floor thereof depressed below the end portions, and two independent truck frames, one under each of the end parts, and each connected to the body part by a vertical pivot, substantially as set forth.

4. In an electric locomotive, the combination of the body having the two relatively elevated end parts, the relatively depressed cab at the central part, the two motor trucks, one under each end part and united thereto by a vertical hinge, each truck being formed of the upwardly extended side bars, the cross bars connecting the side bars and supporting the hinge which unites it to the body, the motor on each truck, and the gearing connecting the motor with each of the axles on the truck, substantially as set forth.

5. In a railway truck, the combination of a frame comprising rigidly connected side parts and a longitudinal central part, wheeled axles adapted to relatively rise and fall in said frame, a motor supported on the longitudinal central part of the frame, and a swiveling device for the truck frame disposed above the motor, substantially as set forth.

6. In a railway truck, the combination of a rigid frame comprising side parts and a longitudinal central part having its ends interposed between and connected to the side parts, wheeled axles adapted to relatively rise and fall in said frame, a motor supported on the longitudinal central part of the frame, and a swiveling device for the truck frame disposed above the motor, substantially as set forth.

7. In an electric locomotive, the combination of a main frame, a truck having a rigid frame, a motor mounted on said truck frame and geared to the truck wheels, means independent of the motor forming a swiveling connection between the truck frame and the main frame, and a draw bar pivoted to the truck at a point adjacent its swiveling connection with the main frame, substantially as set forth.

8. In a motor vehicle, the combination of a main body frame, two independent trucks, each comprising track wheels and a frame to which the main frame is vertically pivoted, motors mounted respectively on the frames of the trucks and connected to the track wheels thereof for driving them, and draw bars vertically pivoted to the respective frames, substantially as set forth.

In testimony whereof I affix my signature in presence of two witnesses.

ALEXANDER PALMROS.

Witnesses:
 LEOTA I. SAYLOR,
 RANOS HUTCHINS.